United States Patent
Huang et al.

(10) Patent No.: US 12,064,816 B2
(45) Date of Patent: Aug. 20, 2024

(54) METHOD FOR PREPARING METAL POWDER BY WATER ATOMIZATION

(71) Applicant: HUNAN TERRY NEW MATERIALS CO., LTD, Hunan (CN)

(72) Inventors: Jinsong Huang, Hunan (CN); Xin Jin, Hunan (CN)

(73) Assignee: HUNAN TERRY NEW MATERIALS CO., LTD., Yiyang (CN)

( * ) Notice: Subject to any disclaimer, the term of this patent is extended or adjusted under 35 U.S.C. 154(b) by 229 days.

(21) Appl. No.: 17/295,059

(22) PCT Filed: Nov. 20, 2018

(86) PCT No.: PCT/CN2018/116366
§ 371 (c)(1),
(2) Date: May 19, 2021

(87) PCT Pub. No.: WO2020/102963
PCT Pub. Date: May 28, 2020

(65) Prior Publication Data
US 2021/0323063 A1    Oct. 21, 2021

(51) Int. Cl.
*B22F 9/08*    (2006.01)
*B22F 1/05*    (2022.01)

(52) U.S. Cl.
CPC ............. *B22F 9/082* (2013.01); *B22F 1/05* (2022.01); *B22F 2009/0828* (2013.01); *B22F 2009/086* (2013.01); *B22F 2301/10* (2013.01)

(58) Field of Classification Search
CPC ....... B22F 9/08–2009/0896; B22F 2009/0828; B22F 2301/10
See application file for complete search history.

(56) References Cited

U.S. PATENT DOCUMENTS

| | | | |
|---|---|---|---|
| 4,304,600 A | 12/1981 | Plewes et al. | |
| 2013/0008690 A1* | 1/2013 | Wiley | B22F 1/0553 428/401 |
| 2017/0144227 A1* | 5/2017 | Nakaseko | C22C 45/02 |

FOREIGN PATENT DOCUMENTS

| | | | | |
|---|---|---|---|---|
| CN | 102941102 A | | 2/2013 | |
| CN | 104511594 A | | 4/2015 | |
| CN | 104711443 A | | 6/2015 | |
| CN | 106041049 A | | 10/2016 | |
| JP | 07113106 A | * | 5/1995 | |
| JP | 2007284715 A | * | 11/2007 | ............ B22F 1/0003 |
| JP | 2018048358 A | | 3/2018 | |
| WO | WO-2018123809 A1 | * | 7/2018 | ............ B22F 1/0003 |

OTHER PUBLICATIONS

CN102941102A English language translation (Year: 2013).*
Yuan et al. (2001). Vacuum Freeze Drier, Chemical Engineers' Handbook. pp. 1067-1069.
English Abstract for CN 102941102 A (2013).
English Abstract for CN 104511594 A (2015).
English Abstract for CN 104711443 A (2015).
English Abstract for JP 2018048358 A (2018).
English Abstract for CN 106041049 A (2016).

* cited by examiner

*Primary Examiner* — Samir Shah
*Assistant Examiner* — Sean P. O'Keefe
(74) *Attorney, Agent, or Firm* — Caesar Rivise, PC

(57) ABSTRACT

A method for preparing metal powder by water atomization is disclosed. The method includes the steps of smelting, atomization, separation and drying, and the metal powder is freeze-dried in the drying step. Experiments show that freeze-drying is an important factor affecting oxygen content indexes of copper and copper alloys, and can be applied to the preparation of copper and copper alloy powder and even metal powder with low oxygen content. The method further considers all the details that may cause oxidation during the atomization process, and takes comprehensive measures to greatly reduce the probability of oxidization of copper and copper alloy powder, so that the oxygen content and oxidation of the water atomized powder are effectively reduced, and the water atomized powder is not easy to be oxidized during long-term storage.

10 Claims, No Drawings

METHOD FOR PREPARING METAL POWDER BY WATER ATOMIZATION

CROSS-REFERENCE TO RELATED APPLICATIONS

This application is a U.S. National Phase Application of PCT/CN2018/116366, filed Nov. 20, 2018, the contents of which are incorporated herein by reference in their entireties for all purposes.

FIELD OF THE INVENTION

The present invention relates to a method for preparing metal powder by water atomization, and particularly to a method for preparing copper powder and copper alloy powder with low oxygen content.

BACKGROUND OF THE INVENTION

Metal (iron, stainless steel, copper and its alloys, nickel, tin, lead, etc.) powder is a basic raw material of powder metallurgy industry, and is also one of the main raw materials for automotive powder metallurgy parts, chemical industry, electronic components and other industries. The performance of the metal powder directly affects the final quality of products. With the development of science and technology, powder metallurgy has made great progress, and some new technologies have been applied and promoted, such as 3D printing and metal powder injection molding (MIM). MIM is a novel powder metallurgy near net forming technology formed by introducing modern plastic injection molding technology into the field of powder metallurgy. Compared with traditional technologies, MIM has the characteristics of high precision, uniform organization, excellent performance, low production cost and the like. The products of MIM have been widely used in the industrial fields of electronic information engineering, biomedical equipment, office equipment, automobiles, machinery, hardware, sports equipment, clocks and watches, weapons and aerospace. Because the requirements for the performance of traditional powder metallurgy products are increasingly high, their service environments are increasingly worse. This also puts forward increasingly high requirements for the raw material powder performance of the powder metallurgy products. Oxygen content in powder performance indexes is a very important index. Because oxygen is usually an impurity in powder metallurgy products and can damage performances of the powder metallurgy products to varying degrees, the lower oxygen content is better.

From a technical point of view, the preparation of powder by gas atomization can meet the requirements of low oxygen content, high degree of sphericity, and fine powder. However, no matter how advanced a technology is, if it is to be widely used and promoted, it must be economically feasible before it has the value and space for promotion and application. The preparation of powder by gas atomization has to use at least nitrogen as the medium to control the oxygen content of the powder. The high-pressure nitrogen significantly increases the production cost, and high-pressure argon or even high-pressure helium increases the cost more. On the other hand, the pressure for the preparation of powder by gas atomization is limited, but the fineness of the powder is greatly dependent on the pressure. The low yield of fine powder prepared by gas atomization is also another important factor for the high cost of the preparation of powder by gas atomization. Although the production technology for gas atomized fine powder with low oxygen content and high sphericity is mature, the high cost has hindered its market promotion. The preparation of powder by ultra-high pressure water atomization can use 10 times or even dozens of times the pressure of gas atomization, and can easily obtain fine powder, but the oxygen content is high, and the oxygen content of water atomized copper alloy powder is generally 10 times or even dozens of times the oxygen content of gas atomized copper alloy powder. Therefore, although the production cost of the preparation of powder by water atomization is low, its technical performance needs to be improved. Hence, the preparation of powder by water atomization is economically feasible, but needs to be improved on technology before it can be widely promoted and applied. The market urgently needs an efficient technology for producing copper alloy powder with low oxygen content to produce high-performance copper alloy powder with low cost and low oxygen content, so as to meet the requirements of the current market for high-end copper alloy powder with low oxygen content. Chinese patent application CN104511594A discloses an improved technology for producing copper alloy powder by a water atomization method, which controls the oxygen content of powder to be less than 0.08% and the rate of −30 μm fine powder to be more than 70%. Compared with the Chinese patent applications CN104511594A, CN106041049A and CN106048298A, the patent of the present invention has a better control effect on oxygen content.

SUMMARY

The purpose of the present invention is to solve the problems that the powder prepared by water atomization has high oxygen content, cannot be stored for a long term, and is easy to oxidize during storage. The present invention adopts a brand-new water atomized powder preparation technology, which efficiently prepares copper and copper alloy powder with low oxygen content, oxidation resistance and long-term storage.

The present invention focuses on the powder preparation steps of smelting, melt transfer, atomization, separation, drying and the like, fully analyzes each influence factor on the oxygen content of powder, and formulates a new set of water atomized powder preparation technology by taking corresponding technological measures, which has achieved unexpected effects in reduction of the oxygen content of the powder, oxidation resistance, powder storage, and the like. Copper alloy powder which has low oxygen content and oxidation resistance and can be stored for a long time is efficiently prepared by the method of water atomization, can meet the requirements of the market, and has broad application prospects.

The technical solution of the present invention is to provide a method for preparing metal powder by a water atomization method, the method includes the steps of smelting, atomization, separation and drying, and the metal powder is freeze-dried in the drying step.

Freeze-drying is a drying technology that uses the principle of sublimation to dehydrate materials. Freeze-drying is often used in other fields, but the application in the technology of preparing powder by atomization has not yet been found. After water is separated from the metal powder, the metal powder containing little water is freeze-dried, so that the water is condensed into ice, and then the ice is directly sublimed. This technology is obviously different from heat drying. In the process of drying the metal powder, isolation from oxygen/air is also required, so vacuum is pumped while heating, that is, vacuum heat drying.

Preferably, a protective atmosphere is used in the smelting and/or atomization steps.

Preferably, a protective atmosphere is used from the smelting to atomization steps.

Preferably, the protective atmosphere is nitrogen.

Preferably, in the atomization step, the atomization liquid is an aqueous solution with a corrosion inhibitor added. The corrosion inhibitor can also be referred to as an antioxidant, and can be preferentially combined with oxygen when being added to the atomization liquid to reduce or avoid oxidation of the metal powder.

Preferably, in the aqueous solution, the mass of the corrosion inhibitor accounts for 0.02-0.1% of the mass of the aqueous solution.

Preferably, the corrosion inhibitor is composed of mercaptobenzothiazole and benzotriazole.

Preferably, in the atomization step, the atomization liquid is water, and the temperature of the water is 0-4° C. Ice cubes are added to the water to form an ice-water mixture, and the temperature of the water preferably reaches and is kept at 0° C.

Preferably, in the smelting step, charcoal is used to cover the surface of the molten metal. The low-density charcoal reacts with oxygen at high temperature, so that the oxygen cannot directly reach the molten metal, and floats on the surface of the molten metal to form a physical isolation layer between the liquid phase and the gas phase of the metal, which reduces the oxidation of the molten metal. The cost of this technology is very low, so the actual application has been very extensive.

Preferably, the metal powder obtained after the drying step is sieved to obtain finished metal powder.

Preferably, the metal powder is copper powder (also called red copper powder) or copper alloy powder.

Preferably, the copper alloy powder is bronze powder or brass powder. The minimum oxygen content of the copper powder is only 0.020%, the oxygen content of the bronze powder is only 0.041%, and the oxygen content of the brass powder is only 0.076%.

The technical principle of the present invention is: no matter how active the metal is at high temperature, there is a tendency of oxidation, and the oxidation of an active metal is more obvious. In order to reduce the oxidation of powder, it has to start from smelting, for example, by means of complete sealing, no matter under positive pressure or negative pressure. Due to the diversity of smelted metals and the diversity of alloy components, the pressure in the sealed space is prone to instantaneous changes, and danger easily occurs during the production process. Sometimes even explosion occurs due to a sharp increase in pressure, causing damage to operators and equipment. The present invention adopts a relatively sealed method and uses nitrogen to isolate oxygen. Compared with the surrounding atmosphere, the sealed space has only slight positive pressure, and has the advantages of safety and reliability. In addition, nitrogen is relatively cheap, which is technically and economically feasible. Isolating oxygen with nitrogen starts from the solid raw metal, followed by the molten metal in the liquid state and the solid alloy powder in order. In the whole powder preparation process, the degree of metal oxidation can be fully reduced, and the oxygen content of the alloy powder can be minimized.

The trace amount of mercaptobenzothiazole and benzotriazole (a mass fraction of 0.04% each) added in the atomization water as a corrosion inhibitor is also very effective in reducing the transformation of the melt into solid powder during atomization and the oxidation during water-powder separation and drying. The corrosion inhibitor coats the metal particles after the liquid metal becomes solid, which reduces the opportunity of surface oxidation reaction of the copper powder.

If the temperature of the atomization water is lower, the cooling capacity of the water is stronger, and the water vapor generated is relatively less and disappears more easily, which is very beneficial to reducing the oxidation of the metal powder. After the alloy powder is separated from the water, the fine powder with large surface area and high activity is prone to surface oxidation reaction to increase the oxygen content.

By means of the freeze-drying method, the wet powder is dried at a very low temperature, the water turns into ice to coat the metal particles, the oxygen loses the opportunity to react with the metal, and then the water is sublimated in the form of ice. In this way, the oxygenation of the powder is completely negligible. After the metal powder is dried, due to the protection of the corrosion inhibitor coated on the surfaces of the particles, oxygen is effectively isolated from the metal powder, so the oxidation resistance of the metal powder is effectively improved, and the metal powder can be stored for a long time without being oxidized.

The beneficial effects of the present invention are: experiments show that freeze-drying is an important factor affecting oxygen content indexes of copper and copper alloys, and can be applied to the preparation of copper and copper alloy powder and even metal powder with low oxygen content. The present invention further considers all the details that may be oxidized during the atomization process, and takes comprehensive measures to greatly reduce the probability of oxidization of copper and copper alloy powder, so that the oxygen content and oxidation of the water atomized powder are effectively reduced, and the water atomized powder is not easy to be oxidized during long-term storage.

DETAILED DESCRIPTION OF EMBODIMENTS

Comparative Example 1

100 kg of electrolytic copper plates were charged into a coreless intermediate frequency furnace for smelting, the electrolytic copper plates were covered with a thick layer of charcoal, and then power was supplied for heating, wherein the charcoal layer could ensure that the molten copper was in a reducing atmosphere to fully remove oxygen from the molten copper. When the quality of the melt met the requirements and the melt was transferred to an intermediate leaking ladle, a leak hole in the center of the leaking ladle, i.e., a diversion pipe, would guide the melt to flow vertically into an atomization tower, and the high-temperature molten metal flow was crushed into powder under the impact of high-pressure water flow (water temperature 25° C.) jet by a jet atomizer. The jet atomizer consisted of an atomizer main body and 4 fan nozzles, every 2 opposite nozzles constituted a group, 2 groups of nozzles were formed in total, and the 2 groups of nozzles were composed of a group of large-diameter nozzles and a group of small-diameter nozzles. After the water atomization was completed, multi-stage jet was used for water-powder separation. After the water-powder separation, the copper alloy powder was dried by vacuum heat drying. The dried powder was sieved, and finished metal powder was finally obtained in batches. The oxygen content of the prepared copper powder was 0.25%, the oxygen content was 0.25% after storage for 2 years, and the yield of −200 mesh powder was 89%.

Comparative Example 2

100 kg of electrolytic copper plates were charged into a coreless intermediate frequency furnace for smelting, the electrolytic copper plates were covered with a thick layer of charcoal, then the furnace was sealed by a furnace cover and nitrogen was introduced for protection, and power was supplied for heating after oxygen was displaced by the nitrogen, while it was ensured that no oxygen was in a hearth when the electrolytic copper was heated in a crucible, so that oxygen was isolated from copper. The thick layer of charcoal could ensure that the molten copper was in a reducing atmosphere to fully remove oxygen from the molten copper. When the quality of the melt met the requirements and the melt was transferred to an intermediate leaking ladle, a leak hole in the center of the leaking ladle, i.e., a diversion pipe, would guide the melt to flow vertically into an atomization tower, and the high-temperature molten metal flow was crushed into powder under the impact of high-pressure water flow (water temperature 25° C.) jet by a jet atomizer. The jet atomizer consisted of an atomizer main body and 4 fan nozzles, every 2 opposite nozzles constituted a group, 2 groups of nozzles were formed in total, and the 2 groups of nozzles were composed of a group of large-diameter nozzles and a group of small-diameter nozzles. After the water atomization was completed, multi-stage jet was used for water-powder separation. After the water-powder separation, the copper alloy powder was dried by vacuum heat drying. The dried powder was sieved, and finished metal powder was finally obtained in batches. The corresponding results of the prepared red copper powder were shown in Table 1.

Comparative Example 3

The previous operations were the same as those in Comparative Example 2. When the quality of the melt met the requirements and the melt was transferred to an intermediate leaking ladle, a sealed and transparent device was used and nitrogen was introduced in advance to protect the melt, so that oxygen was isolated from the high-temperature melt during the transfer from the intermediate frequency furnace to the intermediate leaking ladle. Once the melt was poured into the leaking ladle, a leak hole in the center of the leaking ladle, i.e., a diversion pipe, would guide the melt to flow vertically into an atomization tower, and the high-temperature molten metal flow was crushed into powder under the impact of high-pressure water flow (water temperature 25° C.) jet by a jet atomizer. The jet atomizer consisted of an atomizer main body and 4 fan nozzles, every 2 opposite nozzles constituted a group, 2 groups of nozzles were formed in total, and the 2 groups of nozzles were composed of a group of large-diameter nozzles and a group of small-diameter nozzles. After the water atomization was completed, multi-stage jet was used for water-powder separation. After the water-powder separation, the copper alloy powder was dried by vacuum freeze-drying. The dried powder was sieved, and finished metal powder was finally obtained in batches. The corresponding results of the prepared red copper powder were shown in Table 1.

Comparative Example 4

The previous operations were the same as those in Comparative Example 3. Before the high-temperature melt was transferred to an intermediate leaking ladle, oxygen in an atomization tower was discharged in advance and nitrogen was filled. Once the melt was poured into the leaking ladle, a leak hole in the center of the leaking ladle, i.e., a diversion pipe, would guide the melt to flow vertically into the atomization tower, and the high-temperature molten metal flow was crushed into powder under the impact of high-pressure water flow (water temperature 25° C.) jet by a jet atomizer. The jet atomizer consisted of an atomizer main body and 4 fan nozzles, every 2 opposite nozzles constituted a group, 2 groups of nozzles were formed in total, and the 2 groups of nozzles were composed of a group of large-diameter nozzles and a group of small-diameter nozzles. After the water atomization was completed, multi-stage jet was used for water-powder separation. After the water-powder separation, the copper alloy powder was dried by vacuum heat drying. The dried powder was sieved, and finished metal powder was finally obtained in batches. The corresponding results of the prepared red copper powder were shown in Table 1.

Comparative Example 5

The previous operations were the same as those in Comparative Example 4. A mixture of trace amounts of cetylamine, octadecylamine, sodium phosphate, disodium hydrogen phosphate, mercaptobenzothiazole, and benzotriazole was added to high-pressure water as a corrosion inhibitor. After the water atomization was completed, multi-stage jet was used for water-powder separation. After the water-powder separation, the copper alloy powder was dried by vacuum heat drying. The dried powder was sieved, and finished metal powder was finally obtained in batches. The corresponding results of the prepared red copper powder were shown in Table 1.

Comparative Example 6

The previous operations were the same as those in Comparative Example 5. While the corrosion inhibitor was added, ice cubes were added to a water inlet tower to ensure the coexistence of ice and water, so that the water temperature of the atomization water was as close as possible to 0° C. After the water atomization was completed, multi-stage jet was used for water-powder separation. After the water-powder separation, the copper alloy powder was dried by vacuum heat drying. The dried powder was sieved, and finished metal powder was finally obtained in batches. The corresponding results of the prepared red copper powder were shown in Table 1.

Example 1

The previous operations were the same as those in Comparative Example 6. After the water-powder separation, freeze-drying was used to replace the vacuum heat drying in Comparative Example 6 to dry the copper alloy powder, the dried powder was sieved, and finished metal powder was finally obtained in batches. The corresponding results of the prepared red copper powder were shown in Table 1.

Example 2

Bronze powder was prepared according to the method of Example 1, and the corresponding results of the prepared bronze powder were shown in Table 1.

Example 3

Brass powder was prepared according to the method of Example 1, and the corresponding results of the prepared brass powder were shown in Table 1.

TABLE 1

Performances of copper and copper alloy powder

| Embodiment | Name of powder | Oxygen content/% | Oxygen content after storage for 2 years/% | Yield of −200 mesh powded% | Notes |
| --- | --- | --- | --- | --- | --- |
| Comparative Example 1 | Red copper powder | 0.25 | 0.25 | 89 | a |
| Comparative Example 2 | Red copper powder | 0.24 | 0.24 | 88 | a, b |
| Comparative Example 3 | Red copper powder | 0.23 | 0.23 | 89 | a, b, c |
| Comparative Example 4 | Red copper powder | 0.22 | 0.22 | 88 | a, b, c, d |
| Comparative Example 5 | Red copper powder | 0.19 | 0.20 | 88 | a, b, c, d, e |
| Comparative Example 6 | Red copper powder | 0.13 | 0.13 | 88 | a, b, c, d, e, f |
| Example 1 | Red copper powder | 0.015 | 0.016 | 88 | a, b, c, d, e, f, g |
| Example 2 | Bronze powder | 0.026 | 0.026 | 95 | a, b, c, d, e, f, g |
| Example 3 | Brass powder | 0.076 | 0.076 | 92 | a, b, c, d, e, f, g |

Relevant technical codes for reducing oxygen content used in Notes: a: charcoal layer protection for smelting, b: nitrogen protection for smelting, c: nitrogen protection for melt transfer, d: nitrogen protection for atomization, e: the atomizing liquid using a corrosion inhibitor, f: adding ice cubes to a high-pressure water inlet tower, g: freeze-drying used when the powder was dried.

The invention claimed is:

1. A method for preparing metal powder by a water atomization, comprising the steps of smelting, atomization, separation and drying, wherein: (a) the metal powder is red copper powder or bronze powder, (b) the metal powder is freeze-dried in the drying step, (c) the atomization step comprises the use of water as an atomization liquid, and (d) ice cubes are added to the water to form an ice-water mixture.

2. The method according to claim 1, wherein a protective atmosphere is used in the smelting and/or atomization steps.

3. The method according to claim 2, wherein the protective atmosphere is nitrogen.

4. The method according to claim 1, wherein a protective atmosphere is used from the smelting to atomization steps.

5. The method according to claim 4, wherein the protective atmosphere is nitrogen.

6. The method according to claim 1, wherein the atomization liquid is an aqueous solution with a corrosion inhibitor added.

7. The method according to claim 6, wherein in the aqueous solution, a mass of the corrosion inhibitor accounts for 0.02-0.1% of a mass of the aqueous solution.

8. The method according to claim 6, wherein the corrosion inhibitor is comprised of mercaptobenzothiazole and benzotriazole.

9. The method according to claim 1, wherein in the smelting step a molten metal is formed, and charcoal is used to cover a surface of the molten metal.

10. The method according to claim 1, wherein the metal powder obtained after the drying step is sieved to obtain finished metal powder.

* * * * *